(12) United States Patent
Jotanotivc

(10) Patent No.: US 8,655,586 B2
(45) Date of Patent: Feb. 18, 2014

(54) INTELLIGENT RANGE MAP FOR AN ELECTRIC VEHICLE

(75) Inventor: Mark A. Jotanotivc, Troy, MI (US)

(73) Assignee: Toyota Motor Engineering & Manufacturing North America, Inc., Erlanger, KY (US)

(*) Notice: Subject to any disclaimer, the term of this patent is extended or adjusted under 35 U.S.C. 154(b) by 0 days.

(21) Appl. No.: 13/339,332

(22) Filed: Dec. 28, 2011

(65) Prior Publication Data

US 2013/0173097 A1 Jul. 4, 2013

(51) Int. Cl.
*G01C 19/00* (2013.01)
*G08G 1/123* (2006.01)

(52) U.S. Cl.
USPC .................................. 701/457; 340/995.17

(58) Field of Classification Search
USPC ................... 701/22, 29, 409, 457; 340/995.1, 340/995.17
See application file for complete search history.

(56) References Cited

U.S. PATENT DOCUMENTS

| | | | |
|---|---|---|---|
| 5,790,973 A | 8/1998 | Blaker et al. |
| 6,459,967 B1 | 10/2002 | Otto |
| 6,691,025 B2 | 2/2004 | Reimer |
| 6,864,807 B2 | 3/2005 | Todoriki et al. |
| 7,049,982 B2 | 5/2006 | Sleboda et al. |
| 7,066,216 B2 | 6/2006 | Sato et al. |
| 7,206,720 B2 | 4/2007 | LaPant |
| 7,672,756 B2 | 3/2010 | Breed |
| 7,849,944 B2 | 12/2010 | DeVault |
| 7,999,664 B2 | 8/2011 | Barajas |
| 2003/0018743 A1 | 1/2003 | Tagi |
| 2004/0062963 A1 | 4/2004 | Umayahara et al. |
| 2004/0172193 A1 | 9/2004 | Monde et al. |
| 2004/0236504 A1 | 11/2004 | Bickford et al. |
| 2004/0260465 A1 | 12/2004 | Tu |
| 2005/0146445 A1 | 7/2005 | Sleboda et al. |
| 2006/0058955 A1 | 3/2006 | Mehren |
| 2006/0200284 A1 | 9/2006 | Hwang |
| 2008/0065322 A1 | 3/2008 | Ng et al. |
| 2008/0125966 A1 | 5/2008 | Yamazaki |
| 2008/0167812 A1 | 7/2008 | Geelen |
| 2008/0284678 A1 | 11/2008 | Randel et al. |
| 2009/0005969 A1 | 1/2009 | Tamura |
| 2009/0055094 A1 | 2/2009 | Suzuki |
| 2009/0088964 A1 | 4/2009 | Schaaf et al. |

(Continued)

FOREIGN PATENT DOCUMENTS

| | | |
|---|---|---|
| JP | 2000283774 | 10/2000 |
| JP | 2000292195 | 10/2000 |

(Continued)

*Primary Examiner* — Tuan C. To
*Assistant Examiner* — Aaron L Troost
(74) *Attorney, Agent, or Firm* — Snell & Wilmer LLP

(57) ABSTRACT

An intelligent driving range system for a vehicle for automatically communicating a one-way driving range or a two-way (i.e. round-trip) driving range to a user of the vehicle. The driving range system utilizes a processor for determining whether to select the one-way distance range or the two-way distance range for communication. The processor determines the current driving range and may interface with a vehicle positioning system or navigation components for determining the current location of the vehicle. Either the one-way driving range or the two-way driving range is selected and communicated to the user of the vehicle. The selection may be based upon the current location of the vehicle. The driving range may be communicated by displaying a range map, by displaying a visual notification, or by sounding an audible notification.

10 Claims, 7 Drawing Sheets

(56) References Cited

U.S. PATENT DOCUMENTS

| | | |
|---|---|---|
| 2009/0157289 A1 | 6/2009 | Graessley |
| 2009/0171529 A1* | 7/2009 | Hayatoma ................. 701/36 |
| 2009/0254234 A1 | 10/2009 | Noguchi et al. |
| 2009/0265099 A1 | 10/2009 | Gottlieb |
| 2010/0094496 A1 | 4/2010 | Hershkovitz et al. |
| 2010/0106401 A1 | 4/2010 | Naito et al. |
| 2010/0138098 A1* | 6/2010 | Takahara et al. ............. 701/29 |
| 2010/0161215 A1 | 6/2010 | Karani |
| 2010/0207772 A1 | 8/2010 | Yamamoto |
| 2010/0280700 A1 | 11/2010 | Morgal et al. |
| 2011/0153141 A1 | 6/2011 | Beechie et al. |
| 2011/0241905 A1* | 10/2011 | Niwa ..................... 340/995.1 |
| 2012/0109515 A1 | 5/2012 | Uyeki et al. |
| 2012/0179420 A1* | 7/2012 | Gilman et al. ............. 702/165 |
| 2012/0191289 A1* | 7/2012 | Guo et al. ................. 701/29.1 |
| 2012/0253655 A1* | 10/2012 | Yamada et al. ............ 701/409 |

FOREIGN PATENT DOCUMENTS

| | | |
|---|---|---|
| JP | 2001-112121 | 4/2001 |
| JP | 2003-121174 | 4/2003 |
| JP | 2003294463 | 10/2003 |
| JP | 2005198445 | 7/2005 |
| JP | 2006112932 | 4/2006 |
| JP | 2006115623 | 4/2006 |
| JP | 2010259252 | 11/2010 |
| JP | 2011-232208 | 11/2011 |
| WO | WO2011/092729 A1 * | 8/2011 |
| WO | WO 2011/092729 A1 * | 8/2011 |

* cited by examiner

INTELLIGENT RANGE MAP FOR AN ELECTRIC VEHICLE

BACKGROUND

1. Field

The present invention relates generally to improvements in vehicle driving range systems and more particularly pertains to intelligent driving range systems for electric vehicles.

2. Description of the Related Art

Electric vehicles are becoming increasingly popular among consumers concerned with becoming more environmentally conscious. Electric vehicles help reduce the carbon footprint of an individual by lessening or eliminating the creation of toxic byproducts normally generated when such individual operates a standard automobile utilizing an internal combustion engine. Unfortunately, as with many newer technologies, inconvenient side effects exist for owners or users of such vehicles, many such nuisances stemming from the required utilization of less common fuel sources by the vehicles. Although gasoline refueling stations for internal combustion engine vehicles are commonly situated in almost every geographic location and can often be found in relatively close proximity to one another, refueling stations for alternative fuel sources are much less prevalent. Users of these vehicles must plan ahead before undertaking a drive or trip in the vehicle for fear of running out of energy and becoming stranded with no opportunity to refuel or recharge the vehicle. This dilemma can be particularly problematic in areas of lower population density where alternative refueling stations are even rarer.

The scarcity of such fuel stations is a cause of anxiety for many users of electric vehicles. Moreover, when traveling in geographic locations far from their home address or in unfamiliar areas or locations, driving range anxiety proves to be a source of high stress. To help aid the drivers of such vehicles, driving range maps have been utilized as part of such vehicles to help keep the driver informed of the remaining travel range available for the vehicle before refueling is required. Current driving range maps or methods, however, only display a one-way driving range for the vehicle or include a manual toggle that requires the user of the vehicle to switch between a one-way driving range and a two-way (i.e., round-trip) driving range. This toggle is selectable by the user through interfacing with one or more various controls associated with the range map system. As such, the user must manually configure the range map in order to have the desired information for a particular driving excursion provided. Not only is such a system or setup cumbersome to the user who must frequently toggle the range map between one-way or two-way driving ranges, but the system also encourages errors on behalf of the user. The user may unintentionally base their driving actions upon information shown for a one-way driving range when the driver intended to make a round-trip driving excursion, or vice versa.

Disadvantages in the current systems also exist in that they require the driver of a vehicle to divert their attention to the electronics or controls within the interior of the vehicle for manually configuring the range map instead of focusing upon the surrounding traffic or environment. This drawback is particularly pertinent when a driver must manually interface with the range map controls after the vehicle is already on the road and not sitting in a stationary location away from any potential traffic. A more intelligent range map system that allows a driver to substantially keep their focus on driving and their hands on the steering wheel and/or the gear shift of the vehicle instead of requiring manual manipulation of the controls of the range map system would be advantageous. In addition, drivers would also appreciate and find convenient a more intelligent range map system that required less manual interaction to obtain desired information. Thus, a more efficient manner of determining and/or communicating driving range information to a user would be desirable.

SUMMARY

The present invention may provide various improvements over current vehicle driving range systems. In one embodiment, the present invention may provide a method for communicating a driving range for a vehicle having a processor and include determining a one-way driving range or a two-way driving range for the vehicle based upon an energy level of the vehicle, automatically selecting, using the processor, either the one-way driving range or the two-way driving range and communicating, using the processor, the selected one-way driving range or the two-way driving range to a user of the vehicle.

In another embodiment, the present invention may provide a method for automatically communicating a range map for an electric vehicle having a processor and include providing a battery connected to the vehicle and a display connected to the vehicle, determining, using the processor, a location of the vehicle, determining a one-way driving range or a round-trip driving range for the vehicle based upon a charge level of the battery, choosing or receiving, using the processor, either the one-way driving range or the round-trip driving range based upon the location of the vehicle, and displaying the chosen or received one-way driving range or the round-trip driving range as a range map on the display.

In yet another embodiment, the present invention may provide an automobile including a battery and a processor coupled to the battery. The processor may be configured to determine a location of the vehicle, determine a one-way driving range or a two-way driving range for the vehicle based upon a charge level of the battery, select either the one-way driving range or the two-way driving range based upon the location of the vehicle, and communicate the selected one-way driving range or the two-way driving range.

BRIEF DESCRIPTION OF THE DRAWINGS

Other systems, methods, features, and advantages of the present invention will be or will become apparent to one with skill in the art upon examination of the following figures and detailed description. It is intended that all such additional systems, methods, features, and advantages be included within this description, be within the scope of the present invention, and be protected by the accompanying claims. Component parts shown in the drawings are not necessarily to scale, and may be exaggerated to better illustrate the important features of the present invention. In the drawings, like reference numerals designate like parts throughout the different views, wherein:

DETAILED DESCRIPTION

Figure 1:
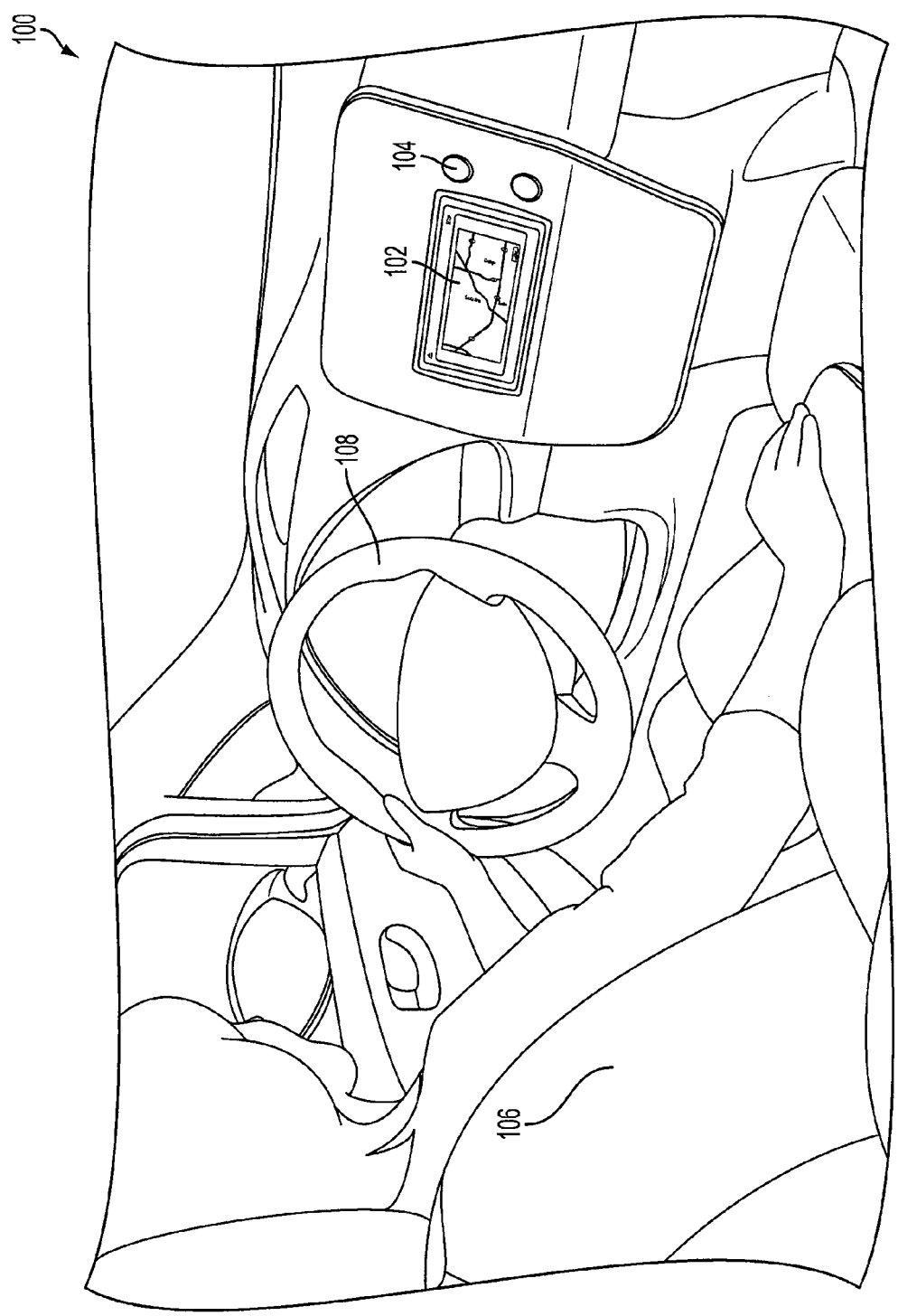
FIG. 1 is a perspective view of an interior of a vehicle having an intelligent driving range system, according to an embodiment of the present invention.

Referring to FIG. 1, the interior 100 of a vehicle is shown and includes a driver seat 106 and a steering wheel 108. A mapping system for displaying a range map includes a display 102 and associated inputs or controls 104. The mapping system is included as part of the center dash or console of the interior 100 of the vehicle. During operation, the mapping system allows a user of the vehicle to glance at the display 102 in order to easily gauge the remaining driving range available for the vehicle before the vehicle needs to be recharged or otherwise refueled. Due to the convenient physical placement of the screen 102 and the associated inputs or controls 104, viewing and/or interfacing with the mapping system is easily performed while operating the vehicle or otherwise seated in the driver seat 106 or location within the interior 100 of the vehicle.

The mapping system may be configured as part of a navigation system of the vehicle for generating and displaying travel routes. Alternatively, the mapping system may be a stand-alone system particularly configured for the display of range maps and may interface with certain components or functions of a discrete navigation system. The display 102 of the mapping system may be configured to display a range map of the surrounding roadways or environment, identify the current location of the vehicle, and place either a one-way or a round-trip graphical indicator upon the map. This graphical indicator corresponds to or represents the remaining driving distance available before the vehicle requires recharging of the vehicle battery, or otherwise needs energy or fuel replenishment.

The display 102 and associated inputs or controls 104 are conveniently placed within an easily viewable and accessible area of the interior 100, such as the center of the dashboard, to facilitate comfortable access by a user of the vehicle to the various functions or features of the mapping system. A positioning system, such as GPS, may also be included as part of the mapping system or otherwise configured to interface with the mapping system for determining the current location of the vehicle or for aiding in the display of a range map. The range map for display upon the display 102 may be centered on a current location of the vehicle. The inputs or controls 104 may be used for manually adjusting various settings or features of the map, such as zoom levels, rotation, and/or movement of the map. The inputs or controls 104 may also allow the user to manually toggle between a one-way or a round-trip indication of available driving range. By utilizing an intelligent mapping system that automatically selects and communicates a one-way or round-trip driving range to the user without requiring manual manipulation of the inputs or controls 104, as discussed in greater detail herein, a user of the vehicle may no longer need to manually toggle the range map driving range indication via the inputs or controls 104 of the mapping system.

Figure 2:
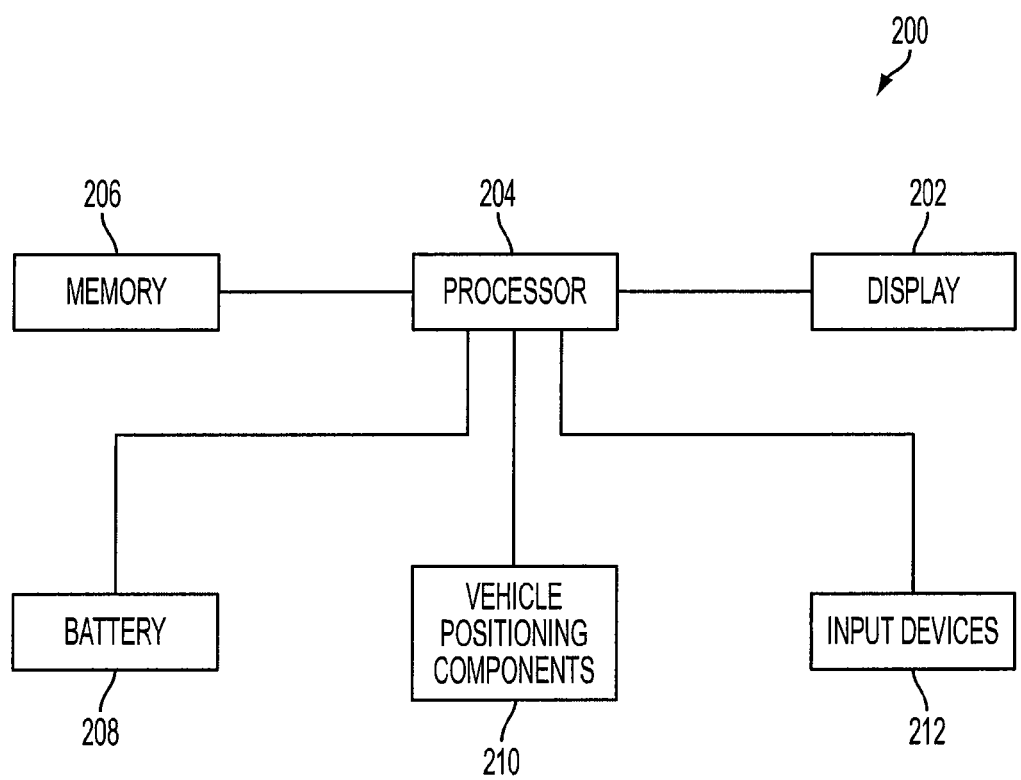
FIG. 2 is a block diagram of various components incorporating an intelligent driving range system, according to an embodiment of the present invention.

Referring next to FIG. 2, a block diagram 200 shows various components incorporating an intelligent driving range system, according to an embodiment of the present invention. A display 202 for displaying or communicating the available driving range to a user of the vehicle is connected to a processor 204. The processor 204 performs the processing operations or functions for determining the available driving range of the vehicle. In addition, the processor 204 also performs the logical steps or selection algorithms for determining or selecting whether the one-way driving range or the round-trip driving range should be communicated to the driver of the vehicle.

The processor 204 is connected to a memory 206 that stores the logical steps or selection algorithms. The memory 206 may also store other necessary data for the intelligent mapping system, for example, home address data, point-of-interest data, geographic maps, etc. In addition, the processor 204 also interfaces with a battery 208 of the vehicle, vehicle positioning components 210 and any other desired input devices 212. The battery 208 of the vehicle has a charge state that diminishes over time as the vehicle is used. The state of the battery 208 charge is an input to the processor 204 for determining the available driving range of the vehicle given the current state of the battery 208 charge. The processor 204 may be connected directly to the battery for determining the state of charge, or the processor 204 may be coupled to the battery 208 through one or more other devices or components (such as a sensor) for determining the state of the charge. The vehicle positioning components 210 may be a navigation or GPS system of the vehicle that is configured to pinpoint the geographic location of the vehicle. The one or more input devices 212 may be any form of user-interfaceable control, such as buttons, knobs, dials, touch-screens, voice-recognition, etc. These input devices 212 allow a user to interface with the processor 204 and thus interact with the mapping system, for example, by altering the zoom level of a range map being displayed on the display 202.

Figure 3:
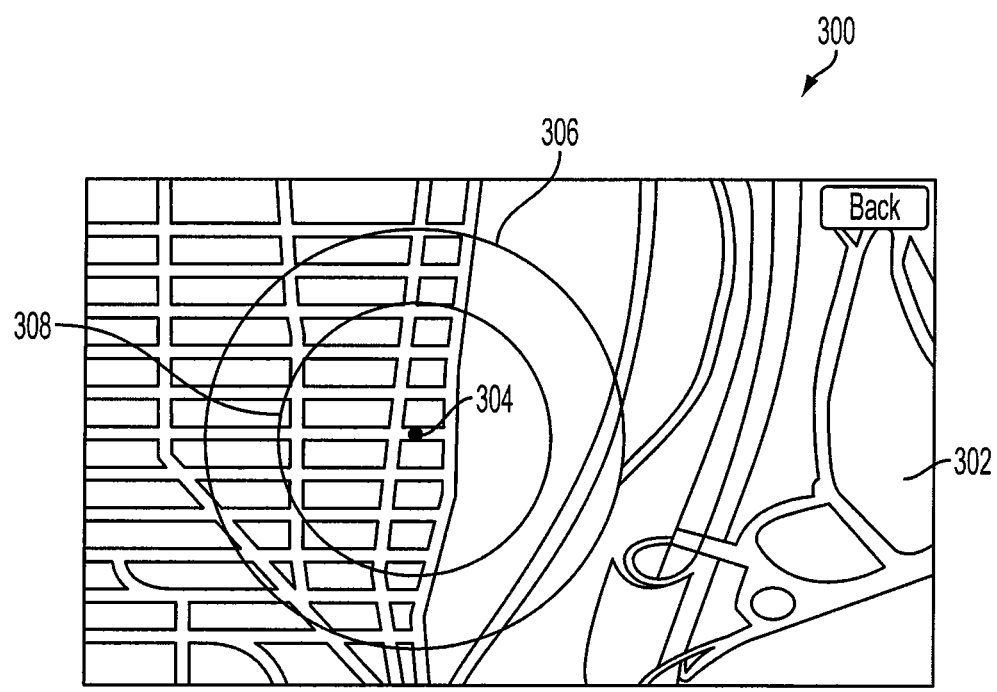
FIG. 3 is a zoomed-in front view of a screen of an intelligent driving range system, according to an embodiment of the present invention.

FIG. 3 shows a zoomed-in front view of a screen or display 300 of an intelligent driving range system, according to an embodiment of the present invention. A processor, which may be the processor 204 of FIG. 2, and/or vehicle positioning components, which may be the vehicle positioning components 210 of FIG. 2, operate to determine a geographic location of the vehicle. Based upon the determined vehicle location, a map 302 is displayed upon the screen 300 and shows a local geographic area surrounding the vehicle. In addition, a marker 304 is shown on the map 302 for pinpointing the determined location of the vehicle for user convenience. This marker 304 may be periodically updated on the map 302 shown on the screen 300 based upon the current location of the vehicle as determined by the processor and/or the vehicle positioning components.

The map 302 on the screen 300 also includes a graphical representation of the capable driving range of the vehicle based upon a state of charge of a battery powering the vehicle. A first contour or outline 306 is disposed around the marker 304 and represents a one-way driving range for the vehicle. Thus, a driver of the vehicle looking at the screen 300 would be informed that the vehicle had enough energy or battery charge to travel to the geographic boundary identified by the first contour or outline 306 on the map 302. Similarly, a second contour or outline 308 is disposed around the marker 304 and represents a round-trip (i.e., two-way) driving range for the vehicle. The driver of the vehicle looking at the screen 300 would thus be informed that the vehicle had enough energy or battery charge to travel to the geographic boundary identified by the second contour or outline 308 and also return to the presently identified current location of the vehicle shown by marker 304.

In the preferred embodiment, only one of the first contour 306 or the second contour 308 is shown on the map at a given moment in time. The intelligent driving range system may automatically determine which of the first contour 306 or the second contour 308 to display, as discussed in greater detail herein. Only displaying one of the first contour 306 or the second contour 308 may help reduce driver confusion. However, in an alternative embodiment, both the first contour 306 and the second contour 308 may be displayed upon the screen 300 at the same time.

The first contour 306 may be shown on the map 302 on the screen 300 as having a first color. The second contour 308 may be shown on the map 302 on the screen 300 as having a second color. The area enclosed by the first contour 306 may also be colored with the first color and the area enclosed by the second contour 308 may also be colored with the second color. If both the first contour 306 and the second contour 308 are shown simultaneously, the area within the second contour 308 may be shaded or colored with the second color while the area between the second contour 308 and the first contour 306 may be shaded with the first color. In an alternative embodiment, no colors may be used or shading or differing line styles may be employed in addition to or in replacement thereof.

Figure 4A:
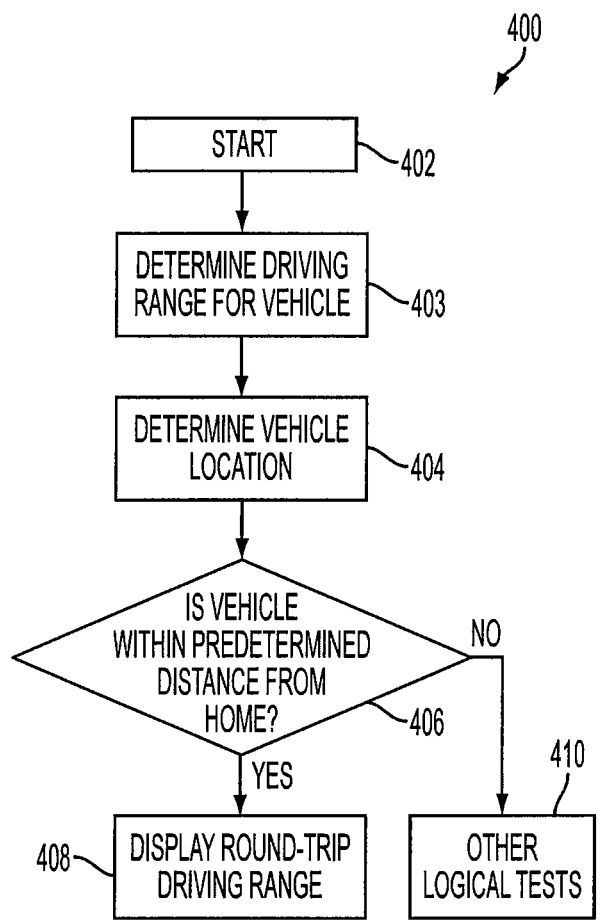
FIG. 4A is a logic flowchart for an intelligent driving range system utilizing a home location logical step, according to an embodiment of the present invention.

Turning next to FIGS. 4A-4D, various logic flowcharts for an intelligent driving range system are shown, according to embodiments of the present invention. FIG. 4A shows one embodiment of a driving range system flowchart 400 with automatic selection and communication of a driving range to a user of a vehicle based upon a home location logical step. The driving range system may utilize a processor, for example, the processor 204 discussed above for FIG. 2, for performing or processing all or some of the steps described herein. The processor may be any type of hardware or circuit capable of performing the method steps described, for example, a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

In addition, the driving range system may incorporate a memory, for example the memory 206 discussed above for FIG. 2, connected with the processor or embedded as part of the processor. This memory may be used for storing the various information or data used in the determinative or selective processes, as discussed in greater detail below. The memory may also be used for storing geographic data, such as maps, addresses, and/or point-of-interest data. For example, various of the one or more logical selection algorithms of the driving range system may be stored in the memory for utilization by the processor. Moreover, geographic data, such as relating to the home location of the vehicle, may also be stored in the memory.

In step 402, the method starts, such as when the vehicle is turned on or the driving range system otherwise receives power from a battery or power source of the vehicle. The method may also start after the vehicle is already turned on or the driving range system has already received power, for example, when the user manually turns on or enables the driving range system after the vehicle is already in operation. In step 403, the driving range system determines the available driving range of the vehicle. The driving range may be determined for a one-way driving range and/or a round-trip driving range. This may be accomplished by interfacing with a battery or a sensor connected to the battery of the vehicle for determining a charge level of the battery. Based upon the charge level of the battery, a processor of the driving range system calculates or otherwise determines the capable travel range of the vehicle before requiring replenishment of the battery. Although the preferred embodiment covers electric vehicles powered by electric batteries, alternative embodiments may determine the driving range of vehicles powered by a variety of fuels, such as gasoline or other alternative energy or fueling sources.

In step 404, the driving range system determines the location of the vehicle, for example, by using or interfacing with one or more geographic positioning components or positioning systems. This may be done by utilizing a navigation system, such as a GPS, to substantially pinpoint the longitude and latitude of the vehicle. The driving range system may be incorporated as part of a navigation system onboard the vehicle, or may be a separate system that interfaces with certain data or components of a navigation system. In an alternative embodiment, no navigation system may be present on the vehicle, the driving range system instead incorporating or interfacing with necessary electronics to geographically locate the vehicle, but without the capability of providing calculated travel routes or travel instructions to the user.

In step 406, the driving range system determines, based upon the location of the vehicle determined in step 404, whether the vehicle is located within a predetermined distance (e.g., 500 meters or miles) of a home address or location for the vehicle. The home address may be a geographic address stored in a memory of the driving range system. In one embodiment, the home address may be manually established by a user of the vehicle, such as by interfacing with associated controls of the driving range system or via voice recognition to set or otherwise establish the home address. In an alternative embodiment, the home address may be established automatically by the driving range system by examining geographic data related to the turn-on and turn-off locations for the vehicle. In this manner, the driving range system may recognize when and/or where a vehicle is powered off for periods of time and associate those geographic locations with a home address for the vehicle. The vehicle may have multiple home address locations or one home address location, any or all of the locations manually or automatically established for the vehicle.

If the vehicle is within the predetermined distance or radius from a home address of the location of the vehicle, then the method continues to step 408. If the vehicle is not within the predetermined distance or radius from a home location of the vehicle, then the method continues to step 410. In step 408, a round-trip (i.e. two-way) driving range is displayed. Thus, when the driving range system determines that the vehicle is within a particular distance of an established home location for the vehicle, the driving range system selects or concludes that a user of the vehicle will wish to know the available driving range of the vehicle in order to travel from their current location to a second location and also to return from that second location to their current location before requiring a recharge of the vehicle. This is because the driving range system recognizes that a user of the vehicle at a home location will likely wish to return to that home location without running out of battery charge.

The round-trip driving range may be displayed to the user as a range map upon a mapping display. As previously discussed, the driving range may be a graphical depiction of the available energy of the vehicle for making a round-trip travel path from and back to a current vehicle location. This graphical depiction may be a contour or outline disposed around a current vehicle location marker and represents the available travel range of the vehicle given the vehicle energy level. As the vehicle continues to travel and thus deplete the energy level, the contour or outline would continue to shrink in size, indicating an ever smaller available driving range before the vehicle runs out of energy.

In an alternative embodiment, the round-trip driving range may be displayed as a numerical element, in replacement of or in addition to the round-trip range map. For example, if the driving range system determines that the vehicle has enough energy to travel 100 total miles, the round-trip driving range may initially be displayed to the user as the number 50, indicating the user has 50 miles of travel range available before the user must begin heading back towards the original vehicle location. Both the numerical element and a range map may be displayed simultaneously to the user for convenience or clarity purposes. By interfacing with associated inputs or controls of the driving range system, a user may specify their display preference.

In replacement of or in addition to the display of the round-trip driving range to the user, an alert may be communicated to the user when an energy level of the vehicle corresponds to an available driving range that is under a predetermined threshold, for example, 20-30 total remaining miles. Because of variances in the driving techniques of particular users (e.g., rate of acceleration, speed, etc.), it can be difficult to accurately predict a driving range for smaller travel distances. The alert may pinpoint on a display the locations of energy replenishing stations. Moreover, the alert may be an audible notification to the user, such as a chime sound, or may be a visual notification to the user, such as an illuminated symbol on the dash, or any combination thereof. The alert thus notifies the user that the vehicle is approaching the end of its driving range before requiring recharge.

In step 410, other logical tests or method steps are looked to before the driving range system can adequately select or conclude whether to display a one-way or a round-trip driving range to a user of the vehicle. These other logical tests or method steps may be logical tests different from flowchart 400, for example, one or more of the steps of flowcharts 430, 460 and/or 480 as described for FIGS. 4B-4D. Alternatively, the other logical tests or method steps may repeat one or more logical tests already processed, for example, by repeating one or more steps present in the flowchart 400. Any logical tests or method steps may be performed in an effort to determine whether to select and/or display a one-way or a round-trip driving range to a user of the vehicle.

The various steps described for flowchart 400 may be performed or processed in any order. For example, an intelligent driving range system may determine the driving range for a vehicle after the driving range system has selected or concluded that either a one-way driving range or a round-trip driving range is to be displayed. In addition, certain steps of flowchart 400 may be omitted or new steps added. A user of the vehicle may also be permitted to manually change or set the type of driving range displayed. This may be accomplished by interfacing with one or more of any associated inputs or controls of the driving range system. Thus, if the intelligent driving range system concludes a round-trip driving range should be displayed, but the user instead prefers a one-way driving range to be displayed, the user may manually command the driving range system to show the one-way driving range. A user may also permanently set a preferred type of driving range, effectively disabling the intelligent logic steps of the driving range system.

Figure 4B:
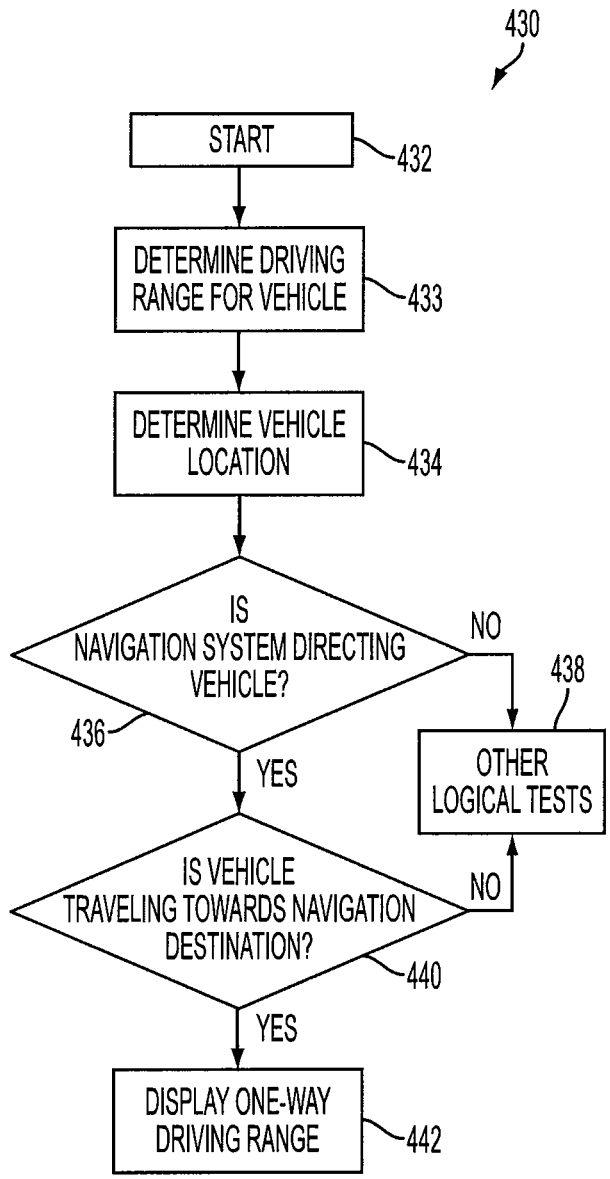
FIG. 4B is a logic flowchart for an intelligent driving range system utilizing a navigation logical step, according to an embodiment of the present invention.

FIG. 4B shows one embodiment of a driving range system flowchart 430 with automatic selection and communication of a driving range to a user of a vehicle based upon a navigation logical step. Certain aspects of the flowchart 430 may be the same or similar to aspects of the flowchart 400, as discussed above for FIG. 4A. For example, the driving range system may utilize a processor and a memory, the same or similar to that discussed above for FIG. 4A. Flowchart 430 is primarily distinguished in its determination and display of a driving range based upon alternative logic relating to navigation of the vehicle. Various of the above features or aspects of flowchart 400 of FIG. 4A may be applicable in the same or similar form to flowchart 430 of FIG. 4B.

In step 432, the method starts, the same or similar as previously described for step 402 of flowchart 400. In step 433, the driving range system determines the available driving range of the vehicle, the same or similar as previously described for step 403 of flowchart 400. In step 434, the driving range system determines the location of the vehicle, the same or similar as previously described for step 404 of flowchart 400.

In step 436, the driving range system determines whether a navigation system of the vehicle is currently directing the vehicle to a specified destination. The driving range system may be a part of an overall navigation system of the vehicle, or the driving range system may be a separate system with a separate processor that interfaces with one or more components of the navigation system of the vehicle. If the navigation system is not currently directing the vehicle to a calculated destination, for example, if the navigation system is turned off, is disabled, or is merely displaying a map to a user but without specific travel instructions or a travel route to a defined destination, then the method continues to step 438, as discussed in greater detail herein.

However, if the navigation system is directing the vehicle, then the method continues to step 440. In step 440, the driving range system determines if the vehicle is traveling towards or otherwise following the instructions or travel route as directed by the navigation system. This may be accomplished by examining the current location and orientation of the vehicle to determine if the vehicle is headed in the direction of the defined destination in the navigation system. If the vehicle is not traveling towards the navigation destination, then the method continues to step 438, as discussed in greater detail herein.

On the other hand, if the vehicle is headed in the direction of the destination of the navigation system, the method continues to step 442. In step 442, a one-way driving range is displayed by the driving range system. Thus, when the driving range system determines that the vehicle is both being directed by a navigation system to a destination and the vehicle is actually traveling towards that destination or according to the navigation system directions, the driving range system selects or concludes that a user of the vehicle will wish to know the available driving range of the vehicle in order to travel from their current location to a second location, but not make a return trip. This is because the driving range system recognizes that a user of the vehicle traveling according to a particular set of driving instructions may not desire to return to their original location on the same battery charge.

The display or communication of the one-way driving range to the user may be the same or similar to the display or communication of the round-trip driving range, as previously discussed for FIG. 4A.

In step 438, other logical tests or method steps are looked to before the driving range system can adequately select or conclude whether to display a one-way or a round-trip driving range to a user of the vehicle. These other logical tests or method steps may be logical tests different from flowchart 430, for example, one or more of the steps of flowcharts 400, 460 and/or 480 as described for FIGS. 4A-4D. Alternatively, the other logical tests or method steps may repeat one or more logical tests already processed, for example, by repeating one or more steps present in the flowchart 430. Any logical tests or method steps may be performed in an effort to determine whether to select and/or display a one-way or a round-trip driving range to a user of the vehicle.

The various steps described for flowchart 430 may be performed or processed in any order. For example, an intelligent driving range system may determine the driving range for a vehicle after the driving range system has already selected or concluded that either a one-way driving range or a round-trip driving range is to be displayed. In addition, certain steps of flowchart 430 may be omitted or new steps added, for example, step 440 may be unnecessary and the driving range system will display a one-way driving range per step 442 whenever a navigation system is directing a vehicle per step 436 even if the vehicle is not currently traveling to the navigation destination. A user of the vehicle may also be permitted to manually change or set the type of driving range displayed, as previously discussed for FIG. 4A.

Figure 4C:
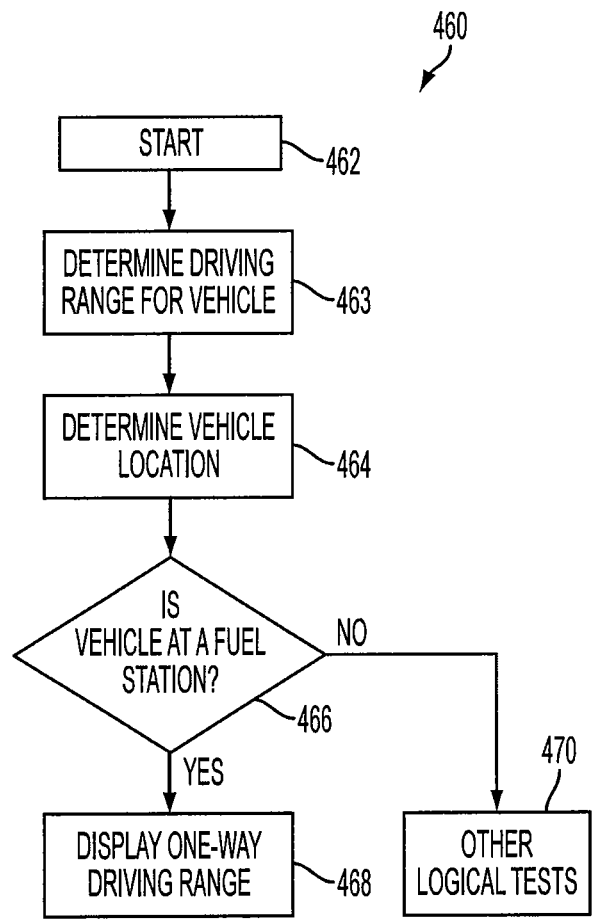
FIG. 4C is a logic flowchart for an intelligent driving range system utilizing a fuel station logical step, according to an embodiment of the present invention.

FIG. 4C shows one embodiment of a driving range system flowchart 460 with automatic selection and communication of a driving range to a user of a vehicle based upon a fuel station logical step. Certain aspects of the flowchart 460 may be the same or similar to aspects of the flowchart 400, as discussed above for FIG. 4A, or flowchart 430, as discussed above for FIG. 4B. For example, the driving range system may utilize a processor and a memory, the same or similar to that discussed above for FIG. 4A. Flowchart 460 is primarily distinguished in its determination and display of a driving range based upon alternative logic relating to vehicle location at or near a fuel station. Various of the above features or aspects of flowchart 400 of FIG. 4A or flowchart 430 of FIG. 4B may be applicable in the same or similar form to flowchart 460 of FIG. 4C.

In step 462, the method starts, the same or similar as previously described for step 402 of flowchart 400. In step 463, the driving range system determines the available driving range of the vehicle, the same or similar as previously described for step 403 of flowchart 400. In step 464, the driving range system determines the location of the vehicle, the same or similar as previously described for step 404 of flowchart 400.

In step 466, the driving range system determines whether the vehicle is located at a fuel station (e.g., an EV station) capable of recharging the battery or other energy storage device of the vehicle. The driving range system may consider a vehicle at a fuel station if the vehicle is located within a predetermined distance of a known geographic location of a fuel station. The fuel station may also be any type of power or energy replenishment station for the vehicle, for example, gasoline stations or hybrid fuel stations. The driving range system may interface with a memory of the vehicle, either as part of the driving range system or as part of a navigation system of the vehicle, to compare the current location of the vehicle to known geographic locations of fuel stations. If the vehicle is not currently located at a fuel station, then the method continues to step 470, as discussed in greater detail herein.

However, if the vehicle is located at a fuel station, then the method continues to step 468. In step 468, a one-way driving range is displayed by the driving range system. Thus, when the driving range system determines that the vehicle is located at a fuel station, the driving range system selects or concludes that a user of the vehicle will wish to know the available driving range of the vehicle in order to travel from their current location to a second location, but not make a return trip. This is because the driving range system recognizes that a user of the vehicle located at a fuel station will likely not desire to make a round-trip to the fuel station, but rather travel to a separate destination without returning. The display or communication of the one-way driving range to the user may be the same or similar to the display or communication of the round-trip driving range, as previously discussed for FIG. 4A, or the one-way driving range, as previously discussed for FIG. 4B.

In step 470, other logical tests or method steps are looked to before the driving range system can adequately select or conclude whether to display a one-way or a round-trip driving range to a user of the vehicle. These other logical tests or method steps may be logical tests different from flowchart 460, for example, one or more of the steps of flowcharts 400, 430 and/or 480 as described for FIGS. 4A-4D. Alternatively, the other logical tests or method steps may repeat one or more logical tests already processed, for example, by repeating one or more steps present in the flowchart 460. Any logical tests or method steps may be performed in an effort to determine whether to select and/or display a one-way or a round-trip driving range to a user of the vehicle.

The various steps described for flowchart 460 may be performed or processed in any order. For example, an intelligent driving range system may determine the driving range for a vehicle after the driving range system has already selected or concluded that either a one-way driving range or a round-trip driving range is to be displayed. In addition, certain steps of flowchart 460 may be omitted or new steps added. A user of the vehicle may also be permitted to manually change or set the type of driving range displayed, as previously discussed for FIG. 4A or FIG. 4B.

Figure 4D:
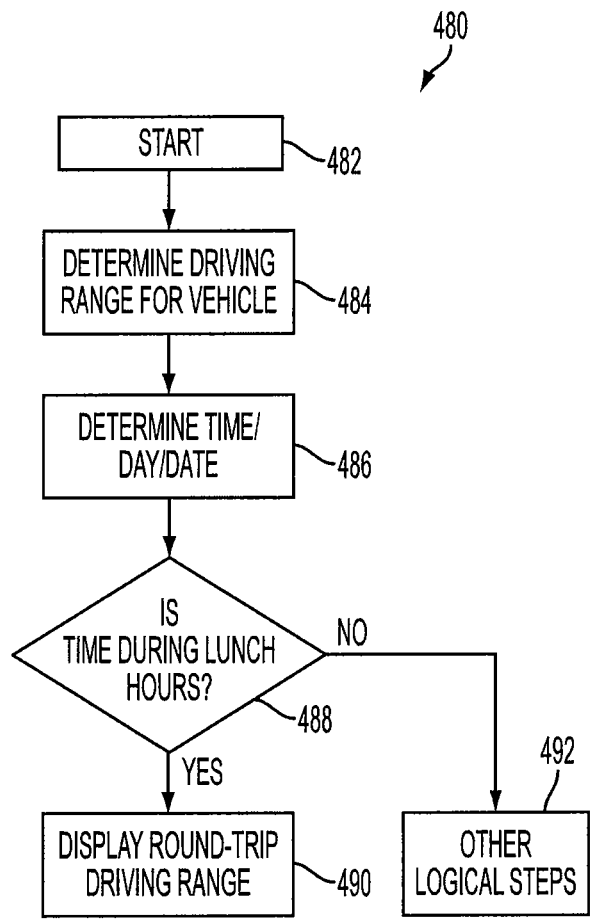
FIG. 4D is a logic flowchart for an intelligent driving range system utilizing a time of day logical step, according to an embodiment of the present invention.

FIG. 4D shows one embodiment of a driving range system flowchart 480 with automatic selection and communication of a driving range to a user of a vehicle based upon a current time, day, and/or date logical step. Certain aspects of the flowchart 480 may be the same or similar to aspects of the flowchart 400, as discussed above for FIG. 4A, flowchart 430, as discussed above for FIG. 4B, or flowchart 460, as discussed above for FIG. 4C. For example, the driving range system may utilize a processor and a memory, the same or similar to that discussed above for FIG. 4A. Flowchart 480 is primarily distinguished in its determination and display of a driving range based upon alternative logic relating to the current time, day, and/or date of travel. Various of the above features or aspects of flowchart 400 of FIG. 4A, flowchart 430 of FIG. 4B, or flowchart 460 of FIG. 4C may be applicable in the same or similar form to flowchart 480 of FIG. 4D.

In step 482, the method starts, the same or similar as previously described for step 402 of flowchart 400. In step 484, the driving range system determines the available driving range of the vehicle, the same or similar as previously described for step 403 of flowchart 400. In step 486, the driving range system determines the current time, day, and/or date. The driving range system may have its own timing and/or dating system or the driving range system may interface with a separate timing and/or dating system of the vehicle.

In step 488, the driving range system determines whether the current time is between predefined or typical lunch time hours, for example, between 11:30 am-1 pm. If the current time falls outside the predefined lunch time hours, then the method continues to step 492, as discussed in greater detail herein. However, if the current time does not fall outside the predefined lunch time hours, then the method continues to step 490.

In step 490, a round-trip driving range is displayed by the driving range system. Thus, when the driving range system determines that the current time is within the predefined lunch time hours, the driving range system selects or concludes that a user of the vehicle will wish to know the available driving range of the vehicle in order to travel from their current location to a second location, and also make a return trip. This is because the driving range system recognizes that a user of the vehicle over lunch time hours will likely desire to make a round-trip back to their current location, such as their work office, without having to refill the battery or other power source of the vehicle. In one embodiment, the driving range system may also examine the current day and/or date in selecting which driving range to display to the user of the vehicle. For example, if the current day of the week is a Saturday or Sunday, the driving range system may conclude the user may not desire a round-trip because the user is likely not at work. The display or communication of the round-trip driving range to the user may be the same or similar to the display or communication of the round-trip driving range, as previously discussed for FIG. 4A, or the one-way driving range, as previously discussed for FIG. 4B or FIG. 4C.

In step 492, other logical tests or method steps are looked to before the driving range system can adequately select or conclude whether to display a one-way or a round-trip driving range to a user of the vehicle. These other logical tests or method steps may be logical tests different from flowchart 480, for example, one or more of the steps of flowcharts 400, 430 and/or 460 as described for FIGS. 4A-4C. Alternatively, the other logical tests or method steps may repeat one or more logical tests already processed, for example, by repeating one or more steps present in the flowchart 480. Any logical tests or method steps may be performed in an effort to determine whether to select and/or display a one-way or a round-trip driving range to a user of the vehicle.

The various steps described for flowchart 480 may be performed or processed in any order. For example, an intelligent driving range system may determine the driving range for a vehicle after the driving range system has selected or concluded that either a one-way driving range or a round-trip driving range is to be displayed. In addition, certain steps of flowchart 480 may be omitted or new steps added. A user of the vehicle may also be permitted to manually change or set the type of driving range displayed, as previously discussed for FIG. 4A, FIG. 4B or FIG. 4C.

Alternative logical steps or methods, similar or different to the flowcharts shown or described for FIGS. 4A-4D may be utilized in other embodiments of the invention. In one embodiment, an intelligent driving range system may display a one-way driving range to a user whenever the available energy of the vehicle is below a predetermined threshold or percentage, such as 50%, 25% or 10%, regardless of the location of the vehicle. In another embodiment, an intelligent driving range system may base the selection or display of a one-way driving range or a round-trip driving range on point-of-interest locations recognized by the driving range system. For example, if the driving range system recognizes that the vehicle is currently located at a hotel, a round-trip driving distance may be automatically selected for display to the user, since the user will likely be treating the hotel as a home address (see previous discussion for FIG. 4A) and thus desire to return to their hotel room after a driving excursion. Those of ordinary skill in the art would appreciate that various logical steps or methods, either alone or combined, could be utilized given the disclosures contained within.

Those of ordinary skill would also appreciate that the various illustrative logical blocks, modules, and algorithm steps described in connection with the examples disclosed herein may be implemented as electronic hardware, computer software, or combinations of both. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosed apparatus and methods.

The steps of a method or algorithm described in connection with the examples disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC). The ASIC may reside in a wireless modem. In the alternative, the processor and the storage medium may reside as discrete components in the wireless modem.

Exemplary embodiments of the invention have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A method for displaying either a one-way driving range or a two-way driving range for a vehicle having a processor and a display, the method comprising:

determining, using the processor, a first location corresponding to a location of the vehicle;

determining, using the processor, a proximity between the first location and a second location or destination;

automatically determining, using the processor and based upon an energy level of the vehicle, at least one of the one-way driving range or the two-way driving range;

automatically selecting, using the processor and based on the determined proximity, only one of a one-way display mode for displaying the one-way driving range or a two-way display mode for displaying the two-way driving range; and selectively displaying, using the display, either the one-way driving range, but not the two-way driving range, when the one-way display mode is automatically selected or the two-way driving range, but not the one-way driving range, when the two-way display mode is automatically selected.

2. The method of claim 1 further comprising:
displaying, using the display, a first contour disposed around the first location and representing the one-way driving range when the one-way display mode is automatically selected, or
displaying, using the display, a second contour disposed around first location and representing the two-way driving range when the two-way display mode is automatically selected.

3. The method of claim 1 wherein the second location is a home address of the vehicle, and the step of automatically selecting, using the processor and based on the determined proximity, only one of the one-way display mode or the two-way display mode includes automatically selecting the two-way display mode when the vehicle is within a predetermined distance of the home address of the vehicle.

4. The method of claim 1 wherein the second location is an energy refueling or recharging location for the vehicle, and the step of automatically selecting, using the processor and based on the determined proximity, only one of the one-way display mode or the two-way display mode includes automatically selecting the one-way display mode when the vehicle is within a predetermined distance of an energy refueling or recharging location for the vehicle.

5. The method of claim 1 wherein the step of automatically selecting, using the processor and based on the determined proximity, only one of the one-way display mode or the two-way display mode includes automatically selecting the one-way display mode when the vehicle is being navigated by a navigation system to the second location or destination.

6. The method of claim 1 further comprising selectively displaying a numerical element corresponding to one of the one-way driving range when the one-way display mode is automatically selected or the two-way driving range when the two-way display mode is automatically selected.

7. The method of claim 1 further comprising communicating, using the processor, an alert to a user of the vehicle when the energy level of the vehicle corresponds to a driving range under a predetermined threshold of one of the one-way driving range when the one-way display mode is automatically selected or the two-way driving range when the two-way display mode is automatically selected.

8. The method of claim 7 wherein the alert includes at least one of generating, using an audio output unit of the vehicle, an audible notification or displaying, using the display, a visual notification to the user of the vehicle.

9. The method of claim 1 wherein:
the one-way driving range includes a first set of destinations towards which the vehicle can complete a one-way trip, and
the two-way driving range includes a second set of destinations towards which the vehicle can complete a first trip and from which the vehicle can complete a second trip.

10. The method of claim 1 wherein the energy level of the vehicle is a current battery charge state of the vehicle.

* * * * *